United States Patent [19]

Deaton

[11] 4,076,008
[45] Feb. 28, 1978

[54] BARBECUE APPARATUS AND METHOD

[76] Inventor: Guy W. Deaton, 6393 Walker Road, Riverdale, Ga. 30296

[21] Appl. No.: 726,767

[22] Filed: Sep. 27, 1976

[51] Int. Cl.² ............................................. A47J 37/07
[52] U.S. Cl. ................................... 126/25 R; 99/447; 126/273 R
[58] Field of Search ................. 126/25 R, 25 A, 25 B, 126/8, 9 R, 273 R, 276, 22, 191, 29; 99/339, 340, 447

[56]  References Cited
U.S. PATENT DOCUMENTS

| 503,872 | 8/1893 | Petersen | 126/191 |
|---|---|---|---|
| 926,531 | 6/1909 | Williams | 126/25 B |
| 2,851,941 | 9/1958 | Cogar | 126/25 A X |
| 3,087,414 | 4/1963 | Gannon | 126/25 R X |
| 3,266,409 | 8/1966 | Oyler | 99/339 X |
| 3,438,364 | 4/1969 | Galloway, Jr. | 126/25 R |
| 3,568,590 | 3/1971 | Grice | 126/25 R X |
| 3,789,824 | 2/1974 | Mason | 126/59.5 |

FOREIGN PATENT DOCUMENTS

| 19,159 | 9/1904 | Austria | 126/276 |
|---|---|---|---|
| 634,382 | 8/1936 | Germany | 126/273 |

Primary Examiner—William F. O'Dea
Assistant Examiner—Harold Joyce
Attorney, Agent, or Firm—Jones, Thomas & Askew

[57] ABSTRACT

A barbeque oven wherein meat is suspended on a perforated food rack within an enclosed, heat retaining housing, and heat and smoke from a firebox adjacent one end of the housing is directed along the length of the housing within a tempering passageway and then up, around the meat, and along the length of the housing in the opposite direction to an exit flue fixed to the top of the housing adjacent said end of the housing. A baffle divides the housing into upper and lower portions for directing the above-described flow of smoke and heat, and insulation located intermediate the food rack and the opening connecting the firebox and the lower portion of the housing prevents direct radiation from the firebox from striking meat on the food rack. Warming closets with a flue for controlling the temperature within said warming closets are provided adjacent said end of the housing above the firebox. The interior of the enclosed end of the housing opposite the firebox is covered with an insulating material, and doors are provided allowing access to the interior of the housing above the food rack to allow addition and removal of meat.

6 Claims, 2 Drawing Figures

BARBECUE APPARATUS AND METHOD

The present invention relates to devices for the cooking of meat and the like using the heat and smoke of burning wood such as hickory. The meat as prepared using this process is commonly known as "barbeque". Desirable characteristics of barbeque are a hickory-smoked flavor, a high degree of tenderness, and substantial retention of the natural juices within the meat.

In order to cook meat which has the above-described characteristics, it is necessary to cook the meat very slowly at a low temperature for several hours in an environment of uniform temperature. This in turn requires that the oven be so constructed as to retain an even heat throughout the cooking portion of the oven to prevent any rapid heat loss through the walls of the oven, to insulate the cooking portion of the oven from the direct heat of burning fuel, and to direct the flow of heat, smoke and combustion gases evenly and uniformly through the cooking portion of the oven. In the past, attempts have been made to construct barbeque ovens capable of cooking moist, tender, and flavorful barbeque. Past barbeque ovens, however, have failed to provide barbeque with the tenderness and moisture retention of meat cooked according to the present invention. It is believed that the failure of past barbeque ovens is attributable to the nonuniform cooking caused by an uneven or nonuniform application of heated air to the cooking meat within the oven. It is further believed that the temperature within past ovens is not uniform as the result of structure which allows rapid heat loss through the walls of the oven.

Thus, it is an object of the instant invention to provide an improved barbeque oven which retains heat and cooks meat slowly at a uniform temperature which is constant over the time required to cook the meat.

It is a further object of the instant invention to provide a barbeque oven which utilizes an indirect source of heat and smoke and a directed flow path of said heat and smoke through the oven so as to provide constant and uniform temperature within the cooking chamber of the oven.

It is a further object of the instant invention to provide a barbeque oven in which combustion gases are tempered to cause the gases to reach a uniform temperature before passing to the cooking chamber of the oven.

It is a further object of the instant invention to provide a barbeque oven which maximizes retention of natural meat juices during the cooking of said meat.

Other objects, features and advantages of the present invention will become apparent when reading the following specification when taken in conjunction with the accompanying drawing, in which.

Generally described, the present invention is a barbeque oven comprising a horizontally disposed elongate housing having two enclosed ends, a firebox adjacent the lower portion of one of the ends of the housing, a cooking chamber within the housing and remote from the firebox and including a perforated food rack, a tempering passageway in communication with the firebox and connecting with the cooking chamber for causing smoke and heat passing through the tempering passageway from the firebox to reach an approximately uniform temperature, means for directing the smoke and heat over and up through the food rack, and means operatively associated with the wall of the housing for providing access to the perforated food rack.

Figure 1:
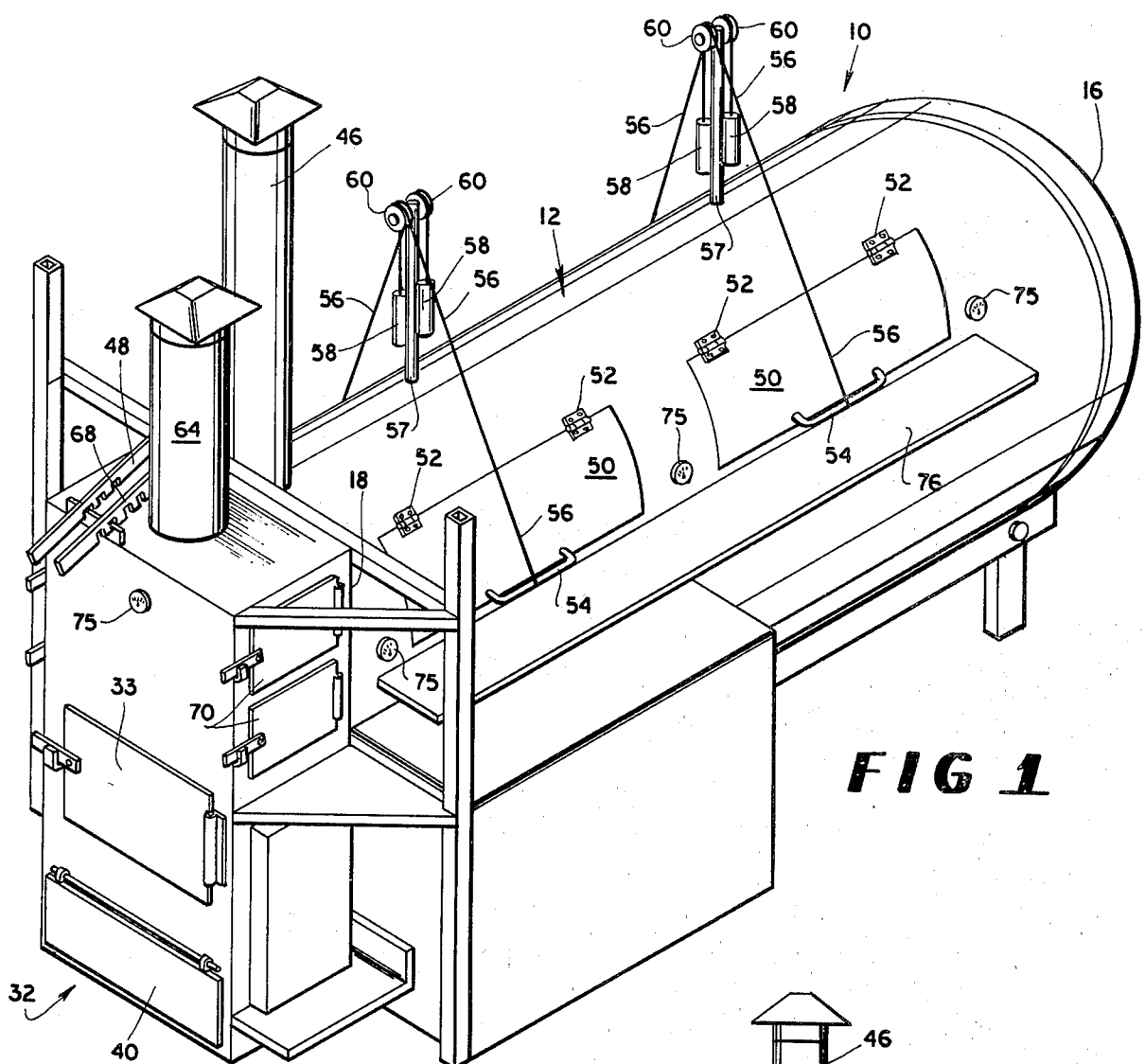
FIG. 1 is a pictorial view of a barbeque oven of the present invention.
Figure 2:
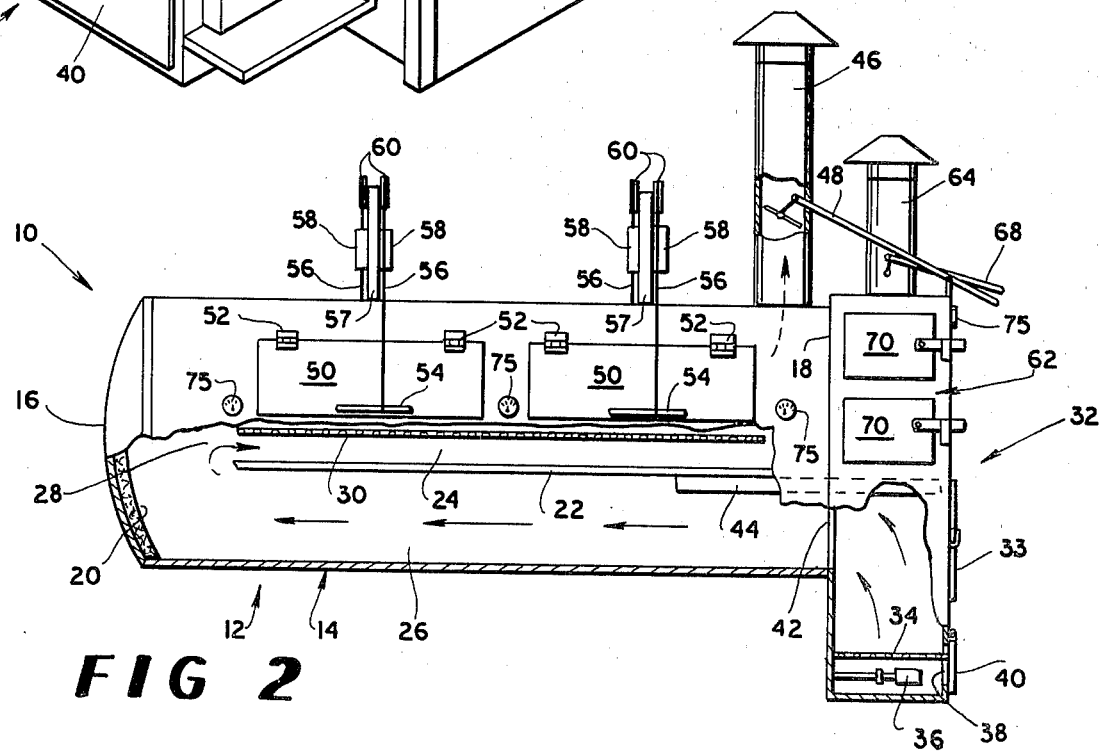
FIG. 2 is a side view of the barbeque oven, with portions cut away to show the interior of the oven.

Referring now in more detail to the drawing, in which like numerals indicate like parts throughout the several views, and to that embodiment of the invention here chosen by way of illustration, FIG. 1 and FIG. 2 show a barbeque oven 10 including a horizontally disposed metal cylinderical housing 12 having a cylindrical wall 14 and two enclosed ends 16 and 18. The cylindrical wall 14 comprises a heavy metal, the thickness of which is increased if a longer cylinder is utilized. For a 10 foot cylinder, for example, a wall thickness of one-quarter inch is sufficient, but it will be understood that other thicknesses of the cylindrical wall 14 may be used in conjunction with the present invention. The cylindrical wall 14 becomes heated during the operation of the barbeque oven 10, and radiates heat evenly toward food cooking within the oven as will be described hereinbelow. However, the cylindrical wall is sufficiently thick to form a thermal barrier which reduces conduction of heat through the wall to a low rate, so that when the interior of the oven reaches normal cooking temperatures a person may touch the exterior of the cylinder without being burned. Since heat cannot quickly escape through the walls of the oven the temperature within the oven will remain more uniform. The first of said enclosed ends 16 of the cylinder is coated on its interior surface with a layer of insulating material 20 such as asbestos or the like.

It will be understood that the housing 12 need not be cylindrical in shape and may be constructed in the form of other elongate, horizontally disposed shapes.

Baffle 22 comprising a metal sheet divides the interior of the cylinder 12 into an upper portion or cooking chamber 24 and a lower portion or tempering passageway 26, said baffle 22 extending across the entire width of the cylinder and along the length of the cylinder. The baffle 22 also provides a pan to catch drippings from meat cooking within the oven and therefore is positioned approximately horizontally with a slight slope toward one corner of the baffle whereby grease drippings on the baffle may drain into a grease reservoir (not shown). A first passageway 28 is provided between the first end of the cylinder 16 and the furthermost extent of the baffle 22 so as to connect the upper portion 24 of the cylinder to the tempering passageway 26. A perforated food rack 30 is supported to extend across the width of the cylinder intermediate the baffle and the uppermost extent of the cylindrical wall 14.

A firebox 32 is fixed to the cylinder adjacent the second end 18 thereof, and includes a wood grate 34 for receiving fuel such as hickory logs and the like, a stoking door 33 for adding such fuel, a suitable fire starter 36 such as a gas burner or the like for igniting said fuel on said wood grate 34, an air inlet 38 for providing air for the combustion of said fuel in said firebox 32, and an adjustable air control door 40 for controlling the rate of flow of air into said firebox means. A second passageway 42 connects the firebox 32 and the lower portion 26 of the cylinder 12 so that smoke, heat and combustion gases from the firebox 32 may freely pass through said second passageway 42 into the cylinder 12.

Insulation barrier 44 comprising firebrick or the like is positioned between the firebox 32 and the food rack 30 to prevent radiation from the firebox 32 from traversing a direct line of sight path from the combustion within firebox 32 to food cooking on the food rack 30, and to generally prevent the part of upper portion 24 of the cylinder 12 adjacent the second end 18 of the cylinder 12 from becoming hot relative to said upper portion 24 adjacent the first end 16. The insulation 44 extends across the entire width of the cylinder and extends from the second end 18 of the cylinder approximately one-fifth of the distance along the length of the cylinder 12.

A flue 46 in the uppermost extent of the cylindrical wall 14 adjacent the second end 18 of the cylinder 12, and a damper 48 within said flue 46, allow escape of heat and smoke from within the cylinder 12 at a selectively determined rate, and thereby allow the temperature within the cylinder 12 to be regulated. A number of controlled access openings comprising doors 50 hung on hinges 52 and having handles 54 connected to said doors are provided in the cylindrical wall 14 above the open-screen rack 30 to allow the addition or removal of meat as is desired. In order to provide for ease in opening the doors 50, counterweights 58 are provided. Pulley support members 57, affixed to the top of the cylindrical wall 14, are rotatably attached to pulleys 60 at the upper extent of said pulley support members 57. Cables 56 are connected at one end to handles 54 and at the other end to counterweight means 58, and are carried intermediate said handles and said counterweights 58 by the pulleys 60.

Warming closets 62 are fixed to the cylinder 12 adjacent its second end 18 above the firebox 32. Access to said warming closets 62 is provided by warming closet doors 70. A warmer flue 64 and warmer damper 68 allow heat from the warming closets 62 to escape through the warmer flue 64 at a rate controlled by the warmer damper 68 and thereby allow the temperature within the warming closets 62 to be selectively regulated.

Thermometers 75 are provided for monitoring the temperature within the cooking chamber and the warming closets. A utility shelf 76 may be used for convenience in adding or removing meat through doors 50.

In operation, access doors 50 are easily raised with the aid of counterweights 58 and the meat to be cooked is placed on food rack 30 within the upper portion 24 of the cylinder 12. Fuel is placed on the wood grate 34 and ignited by the starter 36. The rate of combustion required to produce a low heat and sufficient smoke is controlled by regulating the amount of air entering the firebox 32 through air inlet means 38 by adjusting air control door 40. The heat and smoke of combustion rise and pass through second passageway 42 into the tempering passageway 26 of the cylinder 12. Insulation 44 prevents the relatively hot combustion gasses near the firebox 32 from overheating a portion of the cylinder adjacent the second end 18 of the cylinder, and prevents direct radiant heat from the firebox from striking the meat.

When damper 48 is in an open position, a draft is established within the cylinder 12 and the smoke and heat entering the lower portion 26 of the cylinder from the firebox 32 is confined by the baffle 32 to the tempering passageway 26 of the cylinder and forced to follow a path substantially along the entire length of the cylinder 12 before said smoke and gases may rise into the upper portion or cooking chamber 24 of the cylinder 12 through passageway 28. During this passage of smoke and heat along the tempering passageway 26 of the cylinder, the cylindrical wall 14 and the baffle 22 are heated. A portion of this heat is then radiated by the cylindrical wall 14 and the baffle 22 toward meat on the food rack 30, thus providing even radiant heat from surfaces surrounding said meat.

As the smoke and heat flow toward first passageway 28 along the tempering passageway 26 formed by the baffle 22 and the thick metal cylindrical wall 14, the temperature of various portions of the volume of smoke and gases becomes uniform. When the smoke and heat rises through the first opening 28 into the upper portion 24 of the cylinder 12, insulation 20 lining the interior surface of the first end 16 of the cylinder 12 prevents heat loss through said first end 16. Thus, when the smoke and heat flows along the upper portion 24 of the cylinder 12, passing around the meat and up through the perforated food rack 30 the temperature of the smoke and gases is essentially uniform. The air control door 40 and the damper 48 are used to control the rate of flow of smoke and gases through the barbeque oven 10 and thereby to control the rate of combustion in the firebox 32 and the temperature within the cylinder 12.

When the meat is fully cooked, it may be maintained at a temperature high enough to meet health standards by placing the meat in a warming closet 62, access being gained through the warming closet doors 70. The interior of the warming closets 62 is heated through the direct contact of the warming closets 62 with the second end 18 of the cylinder 12. The temperature within the warming closets 62 may be regulated by adjusting the warmer damper 68 to allow part of the heat to rise and escape through warmer flue 64.

The cooking of meat in the uniform temperature environment of the present invention has resulted in barbeque of the highest quality in terms of the attributes of flavor, tenderness and moisture retention. The retention of natural juices within the meat after cooking may be roughly measured by comparing the weight of the meat before and after cooking in a barbeque oven. It has been found that meat cooked in a barbeque oven of the present invention has retained as much as 75 percent of its uncooked weight, a significant accomplishment. A further advantage is that the sensitive control provided over the rate of combustion in the firebox 32 by the air control door 40 and the damper 48 increases the efficiency of a barbeque oven embodying the present invention and allows large amounts of meat to be cooked slowly over several hours using only a small amount of fuel.

As is apparent from the foregoing specification, the present invention is susceptible of being embodied with various alterations and modifications which may differ particularly from those which have been described in the preceding specification and description. For this reason, it is to be fully understood that all of the foregoing is intended to be merely illustrative and is not to be construed or interpreted as being restrictive or otherwise limiting of the present invention, except as it is set forth and defined in the appended claims.

What is claimed is:

1. A barbeque oven comprising:
   a horizontally disposed elongate housing having two enclosed ends;
   a heat conductive baffle positioned within said housing to divide said housing into an upper portion and a lower portion which communicate by a passageway adjacent one of said enclosed ends;
   a firebox in communication with said lower portion adjacent the other of said enclosed ends;
   a flue means in communication with said upper portion adjacent said other of said enclosed ends; and an insulating means positioned in said lower portion adjacent said other of said enclosed ends and in a position to reduce the direct transfer of heat from said firebox through said baffle into said upper portion by an amount sufficient for said upper portion to be of a substantially uniform temperature along its length in response to the flow of combustion gases from said firebox through said lower portion, said passageway and said upper portion into said flue means.

2. The barbeque oven of claim 1, further comprising a plurality of warming closets above said firebox and adjacent the upper portion of said other end of the housing including a warmer flue and a warmer flue damper for controlling the rate of escape of heat from said warming closets through said warmer flue.

3. The barbeque oven of claim 1, further comprising
a plurality of hinged doors in the upper portion of the housing operative to open outwardly and upwardly; a plurality of handles, one of said handles fixed adjacent a lower edge of each of said plurality of doors;
a plurality of cables each having two ends, the first of said ends connected to one of said handles;
a plurality of counterweights, each connected to the second end of one of said cables;
a plurality of pulley support members fixed above the housing; and
a plurality of pulleys each rotatably connected to one of said pulley support members, said pulleys movably carrying one of said cables intermediate the respective handle and counterweight.

4. The barbeque oven of claim 1, wherein said firebox includes a wood grate; stoking means for selectively permitting the addition of fuel; starter means for igniting fuel in said firebox; an air inlet; and air control means for controlling the rate of flow of air into said firebox means.

5. The barbeque oven of claim 1, wherein said upper portion of said housing includes a generally horizontal perforated food rack.

6. The barbeque oven of claim 1, wherein said heat conductive baffle comprises a metal sheet.

* * * * *